US008469827B2

(12) United States Patent
Nakagaito et al.

(10) Patent No.: US 8,469,827 B2
(45) Date of Patent: Jun. 25, 2013

(54) TORQUE FLUCTUATION ABSORBER

(75) Inventors: Satoshi Nakagaito, Kariya (JP); Tomohiro Saeki, Anjo (JP); Kazumi Ogawa, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/235,001

(22) Filed: Sep. 16, 2011

(65) Prior Publication Data
US 2012/0077605 A1    Mar. 29, 2012

(30) Foreign Application Priority Data
Sep. 24, 2010 (JP) ................................. 2010-214350

(51) Int. Cl.
*F16F 15/121* (2006.01)
(52) U.S. Cl.
USPC ....................................... 464/68.92; 192/205
(58) Field of Classification Search
USPC .................... 464/68.4, 68.41, 68.92; 192/205, 192/213; 267/179
See application file for complete search history.

(56) References Cited

U.S. PATENT DOCUMENTS

| | | | | |
|---|---|---|---|---|
| 5,052,244 A | * | 10/1991 | Kamiya et al. | 464/68.41 |
| 5,065,642 A | * | 11/1991 | Kagiyama et al. | 464/68.41 |
| 5,092,820 A | * | 3/1992 | Naudin et al. | 464/68.92 |
| 5,562,542 A | * | 10/1996 | Rohrle | 464/68.92 X |
| 5,788,041 A | * | 8/1998 | Viola et al. | 192/205 |
| 6,923,725 B2 | | 8/2005 | Takeuchi et al. | |
| 7,207,889 B2 | * | 4/2007 | Fukushima | 464/68.41 |
| 2003/0087704 A1 | | 5/2003 | Takeuchi et al. | |
| 2005/0070363 A1 | * | 3/2005 | Nakagaito et al. | |
| 2008/0237950 A1 | * | 10/2008 | Oono et al. | |

FOREIGN PATENT DOCUMENTS

| | | |
|---|---|---|
| JP | 2002-013547 A | 1/2002 |
| JP | 2003-194095 A | 7/2003 |

* cited by examiner

*Primary Examiner* — Gregory Binda
*Assistant Examiner* — Matthieu Setliff
(74) *Attorney, Agent, or Firm* — Buchanan Ingersoll & Rooney PC

(57) ABSTRACT

A torque fluctuation absorber includes a seating member having a pivoting portion at an inner portion in a radial direction and a supporting portion, which rotationally supports the pivoting portion, at an end surface in a circumferential direction of a first and a second opening portion. When no relative rotational torsion existing between a first and a second rotational member, the pivoting portion is in contact with the supporting portion and a clearance is defined between a portion on each seating member positioned outwardly in a radial direction relative to the pivoting portion and a portion of the first and the second opening portion positioned outwardly in a radial direction relative to the supporting portion. At a first torsion angle, the portion on each seating member contacts the portion of first or second opening portion in a state where the pivoting portion is in contact with the supporting portion.

6 Claims, 5 Drawing Sheets

TORQUE FLUCTUATION ABSORBER

CROSS REFERENCE TO RELATED APPLICATIONS

This application is based on and claims priority under 35 U.S.C. §119 to Japanese Patent Application 2010-214350, filed on Sep. 24, 2010, the entire content of which is incorporated herein by references.

TECHNICAL FIELD

This disclosure generally relates to a torque fluctuation absorber.

BACKGROUND DISCUSSION

A torque fluctuation absorber, for example for a hybrid vehicle, is equipped on a power transmission path between an engine and a motor generator (or a transmission), and absorbs (or buffers) fluctuation torque generated between the engine and the motor generator (or the transmission). A type of torque fluctuation absorber includes a damper portion, which absorbs the fluctuation torque by elastic force, and a hysteresis portion, which absorbs (or buffers) fluctuation by hysteresis torque by, for example, friction (see JP2002-13547A and JP2003-194095). The aforementioned type of torque fluctuation absorber provides a low torsional rigidity for a low torque range as a torsional characteristic at the damper portion to avoid generating resonance when an engine speed is low.

With the above torsional characteristic at the damper portion, a driver loses drivability by sensing a discomfort due to a large torsional rigidity difference at a transition from the low torque range to a high torque range.

A need thus exists for a clutch cover assembly, which is not susceptible to the drawback mentioned above.

SUMMARY

In light of the foregoing, the disclosure provides a torque fluctuation absorber which include a first rotational member including a first opening portion, a second rotational member aligned on a same axis of the first rotational member and including a second opening portion, a coil spring placed within the first opening portion and the second opening portion for buffering a relative rotational torsion between the first rotational member and the second rotational member, seating members placed at opposing ends of the coil spring, each seating member selectively contacting an end surface in a circumferential direction of the first opening portion and of the second opening portion, the seating member including a pivoting portion at an inner portion in a radial direction, and a supporting portion at the end surface in the circumferential direction of the first opening portion and of the second opening portion, the supporting portion which rotationally supports the corresponding pivoting portion. When no relative rotational torsion existing between the first rotational member and the second rotational member, the pivoting portion on the corresponding seating member is in contact with the corresponding supporting portion of the first opening portions and the second opening portions and a clearance is defined between a portion on each of the seating members positioned outwardly in a radial direction relative to the pivoting portion and a portion of the first opening portions and of the second opening portions positioned outwardly in a radial direction relative to the supporting portion. When a relative rotational torsion exists between the first rotational member and the second rotational member and when the relative rotational torsion angle between the first rotational member and the second rotational member reaches a first torsion angle, the portion on the seating member positioned outwardly in the radial direction relative to the pivoting portion comes in contact with the portion of the first opening portions or the second opening portions positioned outwardly in the radial direction relative to the pivoting portion in a state where the pivoting portion on the corresponding seating member is in contact with the corresponding supporting portion of the first opening portions and the second opening portions.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
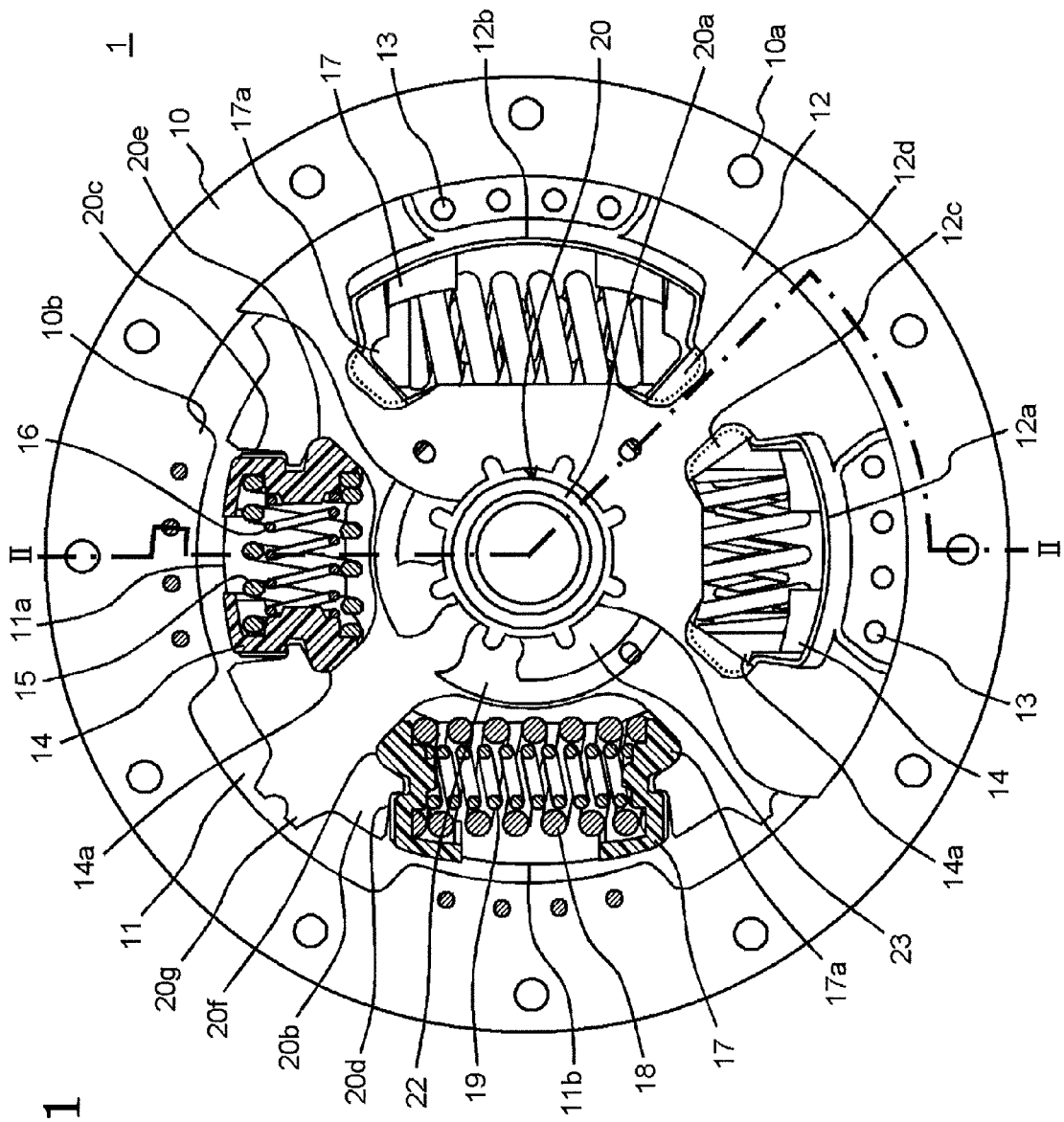
FIG. 1 is a partially cut-away plan view of a configuration of a torque fluctuation absorber according to an embodiment.
Figure 2:
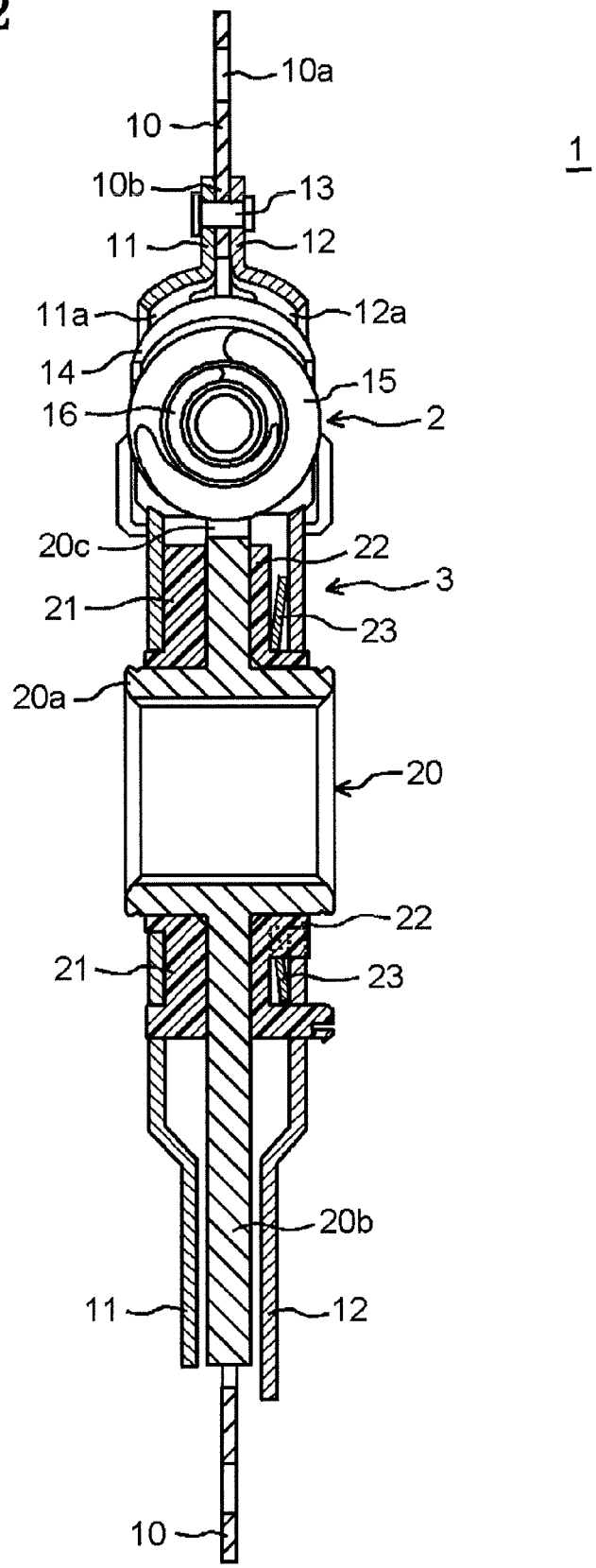
FIG. 2 is a cross-sectional view taken along line II-II in FIG. 1 for the configuration of the torque fluctuation absorber according to the embodiment.
Figure 3A:
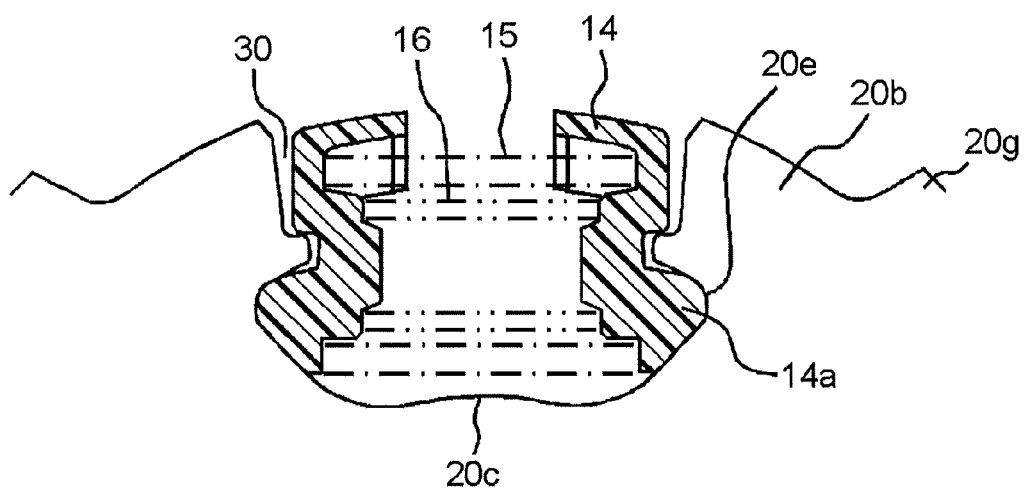
FIG. 3A is a first view which shows a clearance between a flange portion and a first seating member of an opening portion of a damper portion of the torque fluctuation absorber according to the embodiment.
Figure 3B:
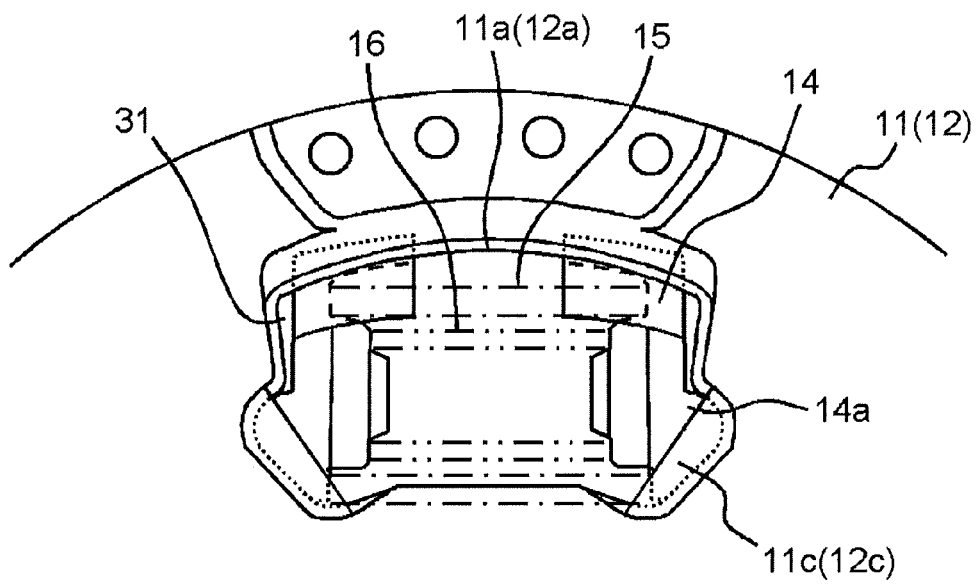
FIG. 3B is a first view which shows a clearance between a side plate and the first seating member of an opening portion of the damper portion of the torque fluctuation absorber according to the embodiment.
Figure 4A:
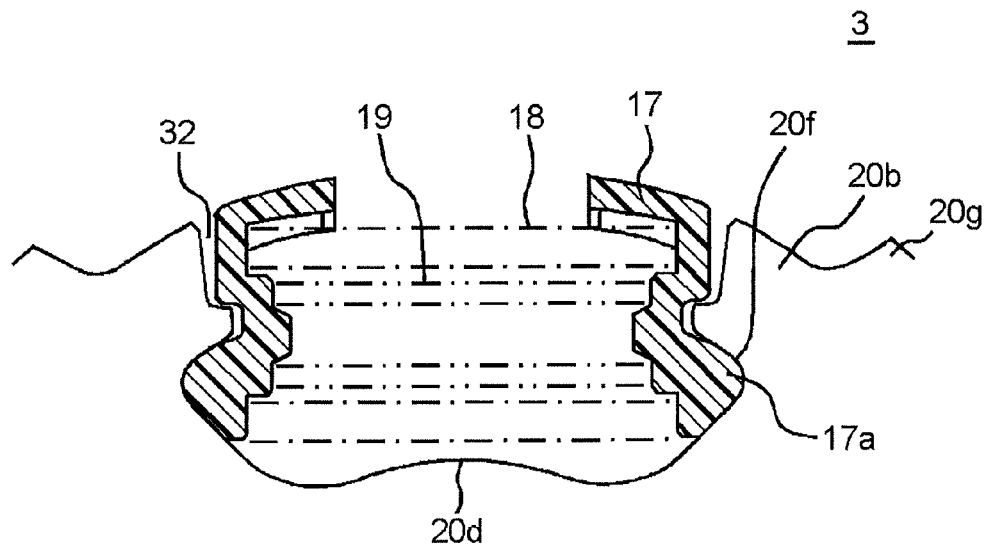
FIG. 4A is a second view which shows a clearance between the flange portion and a second seating member in an opening portion of a damper portion of the torque fluctuation absorber according to the embodiment.

An embodiment of a torque fluctuation absorber 1 according to this disclosure will be described with reference to the accompanying drawings FIGS. 1 to 5. Note that FIGS. 1 to 4 show conditions when no relative rotational torsion exists at the dumper portion. The torque fluctuation absorber 1 according to an embodiment disclosed here includes side plates 11, 12 (as shown in FIG. 1), serving as first rotational members, which include opening portions 11a, 12a (as shown in FIG. 1), serving as first opening portions, a hub member 20 (as shown in FIG. 1), serving as a second rotational member, aligned on a same axis of the side plates 11, 12, which includes opening portions 20c (as shown in FIG. 1), serving as second opening portions, a set of first coil springs 15, 16 (as shown in FIG. 1), serving as coil springs, each placed within the opening portions 11a, 12a, 20c for buffering a relative rotational torsion between the side plates 11, 12 and the hub member 20, a pair of first seating members 14 (as shown in FIG. 1), serving as seating members, placed at opposing ends of each set of first coil springs 15, 16, each of the first seating members 14 selectively contacting a corresponding end surface in a circumferential direction of the corresponding opening portions 11a, 12a, 20c, the first seating members 14, each of which include a first pivoting portion 14a (as shown in FIG. 1), serving as a pivoting portion, positioned inwardly in a radial direction, and first supporting portions 11c, 12c, 20e (as shown in FIG. 1), serving as a supporting portion, which rotationally supports the corresponding first pivoting portion 14a at the end surface in the circumferential direction of the corresponding opening portions 11a, 12a, 20c. When no relative rotational torsion exists between the side plates 11, 12 and the hub member 20, the first pivoting portions 14a on the corresponding first seating members 14 are in contact with the corresponding first supporting portions 11c, 12c, 20e of the opening portions 11a, 12a, 20c, while a clearance 30, 31 (as shown in FIG. 3A, 3B) is defined between a portion on each of the first seating members 14 positioned outwardly in a radial direction relative to the first pivoting portion 14a and a corresponding portion of the opening portions 11a, 12a, 20c positioned outwardly in a radial direction relative to the first supporting portion 11c, 12c, 20e. When a relative rotational torsion exists between the side plates 11, 12 and the hub member 20 and when the relative rotational torsion angle between the side plates 11, 12 and the hub member 20 reaches a torsion angle A (as shown in FIG. 5), equivalent to a first torsion angle, the portion on the first seating member 14 positioned outwardly in the radial direction relative to the first pivoting portion 14a comes in contact with the corresponding portion of the opening portions 11a, 12a, or the opening portion 20c positioned outwardly in a radial direction relative to the corresponding first supporting portion 11c, 12c, 20e in a state where the first pivoting portion 14a on the corresponding first seating member 14 is in contact with the corresponding first supporting portion 11c, 12c, 20e in the opening portions 11a, 12a, 20c.

The torque fluctuation absorber 1 according to the embodiment is provided, for example, on a power transmission path between a rotation shaft of an engine and a rotation shaft of a motor generator (i.e. for example, a motor generator for a hybrid vehicle, a clutch drum for an automatic transmission, and a pulley for a CVT) for absorbing (or buffering) fluctuation torque when a torsion exists between the aforementioned two rotation shafts. The torque fluctuation absorber 1 includes structures to absorb a relative rotational torsion that is a damper portion 2, which absorbs a fluctuation torque by a spring force, and a hysteresis portion 3, which absorbs (or buffers) fluctuation torque by a hysteresis torque for example by friction. The torque fluctuation absorber 1 may be equipped with a limiter portion, which releases the fluctuation torque excessive for the damper portion 2 and the hysteresis portion 3 by intentionally disengaging the aforementioned two rotation shafts.

The damper portion 2 receives a rotational power from the rotation shaft on the engine side and outputs the received rotational power to the rotation shaft on the motor generator side. The damper portion 2 includes the set of first coil springs 15, 16 alternately positioned on a circular line concentric to the hub portion 2 with a set of second coil springs 18, 19, serving as separate coil springs. Each set of first coil springs 15, 16 of the damper portion 2 are positioned at a 90 degrees shifted position from the set of second coil springs 18, 19.

The hysteresis portion 3 and the damper portion 2 are arranged at a functionally parallel position on the power transmission path. The hysteresis portion 3 is annularly formed and arranged on a circular line inwardly in a radial direction relative to the damper portion 2.

The torque fluctuation absorber 1 includes a plate 10, the side plates 11, 12, rivets 13 or other connecting means, the first seating members 14, the first coil springs 15, 16, second seating members 17, serving as separate seating members, the second coil springs 18, 19, the hub member 20, thrust members 21, 22 and a coned disc spring 23.

The plate 10 is an annular plate member. The plate 10 includes multiple through-hole portions 10a for inserting bolts or other connecting means thereinto. At the through-hole portions 10a, the bolts or other connecting means retains the plate 10 to the flywheel connected to the rotation shaft of the engine. The plate 10 includes multiple projected portions 10b projecting inwardly in a radial direction from the inner periphery end of the plate 10. The projected portions 10b are sandwiched between the side plates 11, 12 and are retained together with the side plates 11, 12 by the rivets 13 or other connecting means. Thus, the plate 10 rotates together with the side plates 11, 12. The projected portion 10b is a member composing a stopper portion that restricts excessive relative rotational torsion (excessive relative rotational torsion between the hub member 20 and the side plates 11, 12) occurring at the damper portion 2. Each of the projected portions 10b selectively contacts projections 20g of the hub member 20 at ends thereof in a circumferential direction.

The side plate 11 is an annular plate member, and is a member composing the damper portion 2 and the hysteresis portion 3. The side plate 11 transmits a rotational power from the plate 10 to the damper portion 2 and the hysteresis portion 3. The side plate 11 is positioned having a space between the side plate 12. The side plate 11 is connected to the side plate 12 at the outer periphery portion by the rivets 13 or other connecting means together with the projected portion 10b of the plate 10. The side plate 11 rotates together with the plate 10 and the side plate 12. The side plate 11 includes the opening portions 11a, which contain the first seating members 14 and the set of first coil springs 15, 16, and includes opening portions 11b, serving as third opening portions, which contains the second seating members 17, and the set of second coil springs 18, 19 at the damper portion 2, in other words at a middle portion in a radial direction of the side plate 11. The side plate 11 engages with the thrust member 21 at the hysteresis portion 3, which is positioned inwardly in a radial direction relative to the damper portion 2 in a manner that the thrust member 21 moves in an axial direction and the rotation is restricted. The side plate 11 is rotationally supported to the hub member 20 intermediated by the thrust member 21.

Each of the opening portion 11a includes the pair of first supporting portions 11c on one of circumferential end surfaces of the opening portion, the end surface positioned inward in the radial direction. Each of the first supporting portions 11c selectively contacts the corresponding first pivoting portion 14a on the corresponding first seating member 14. When no relative rotational torsion exists at the damper portion 2, both first supporting portions 11c are in contact with the first pivoting portion 14a on the corresponding first seating member 14. When a relative rotational torsion exists at the damper portion 2, one of the pair of first supporting portions 11c is in contact with the first pivoting portion 14a on the corresponding first seating member 14 while the other first supporting portion 11c is detached from the first pivoting portion 14a on the other first seating member 14. Each of the first supporting portions 11c rotationally (pivotally) supports the first pivoting portion 14a on the corresponding first seating member 14 while the first pivoting portion 14a is in contact with the corresponding first supporting portion 11c.

At each of the opening portions 11a, when no relative rotational torsion exists at the damper portion 2, the clearance 31 (as shown in FIG. 3B) is defined between a portion on the first seating member 14 positioned outwardly in a radial direction and a portion of the opening portion 11a positioned outwardly in a radial direction relative to the first supporting portion 11c. At each of the opening portions 11a, when a relative rotational torsion exists at the damper portion 2, the clearance 31 (as shown in FIG. 3B) becomes smaller between the first seating member 14, which is in contact with the first supporting portion 11c, at the portion outward in the radial direction and the corresponding portion of the opening portion 11a positioned outwardly in the radial direction relative to the first supporting portion 11c. Further, when the clearance 31 (as shown in FIG. 3B) becomes none, the portion of the opening portion 11a positioned outwardly in the radial direction relative to the first supporting portion 11c starts biasing the portion on the first seating member 14 positioned outwardly in the radial direction. Moreover, when a relative rotational torsion exists at the damper portion 2, the portion of the opening portion 11a positioned outwardly in the radial direction relative to the first supporting portion 11c moves further away from the first seating member 14, which is detached from the corresponding first supporting portion 11c.

Each of the opening portions 11b includes a pair of second supporting portions 11d, serving as separate supporting portions, on one of circumferential end surfaces of the opening portion 11b, the end surface which is at inward in radial direction. Each of the second supporting portions 11d selectively contacts a corresponding second pivoting portion 17a, serving as a separate pivoting portion, on the corresponding second seating member 17. When no relative rotational torsion exists at the damper portion 2, no contacting portion is defined between any of the second supporting portions 11d and any of the second seating members 17. When a relative rotational torsion exists at the damper portion 2, both of the second supporting portions 11d are detached from the corresponding second seating members 17 until one of the pair of second supporting portions 11d, 12d, serving as separate supporting portions, of the opening portion 11b, 12b, serving as the third opening portion, on the side plates 11, 12 comes in contact with the second pivoting portion 17a on the corresponding second seating member 17. When a further relative rotational torsion exists at the dumper portion 2, and after one of the pair of second supporting portions 11d, 12d of the opening portions 11b, 12b on the side plates 11, 12 comes in contact with the second pivoting portion 17a on the corresponding second seating member 17, the detached distance between the other second supporting portion 11d of the pair and the corresponding second seating member 17 becomes larger. Each of the second supporting portions 11d rotationally (pivotally) supports the second pivoting portion 17a on the corresponding second seating member 17 while the second pivoting portion 17a on the corresponding second seating member 17 is in contact with the corresponding second supporting portion 11d.

Figure 4B:
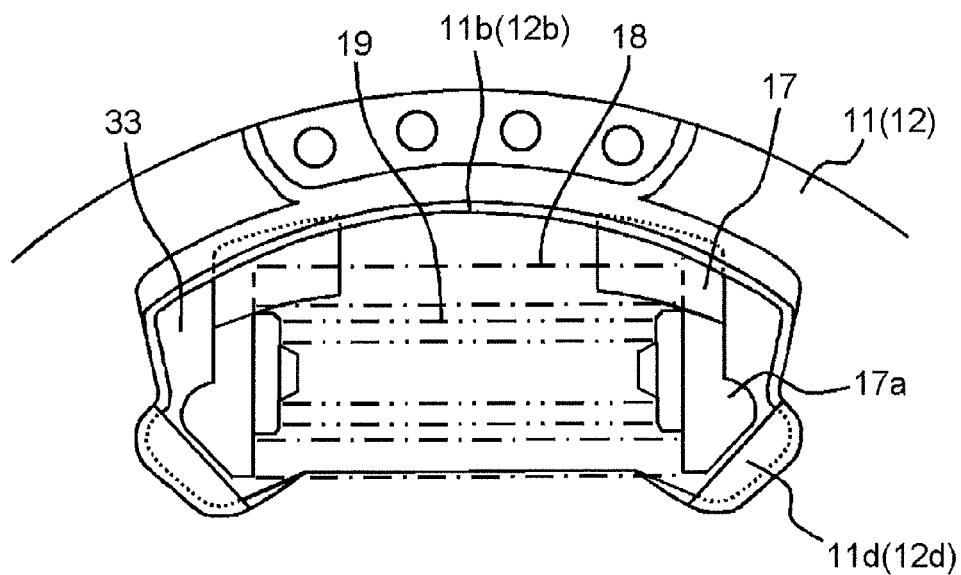
FIG. 4B is a second view which shows a clearance between the side plate and the second seating member of an opening portion of the damper portion of the torque fluctuation absorber according to the embodiment.
Figure 5:
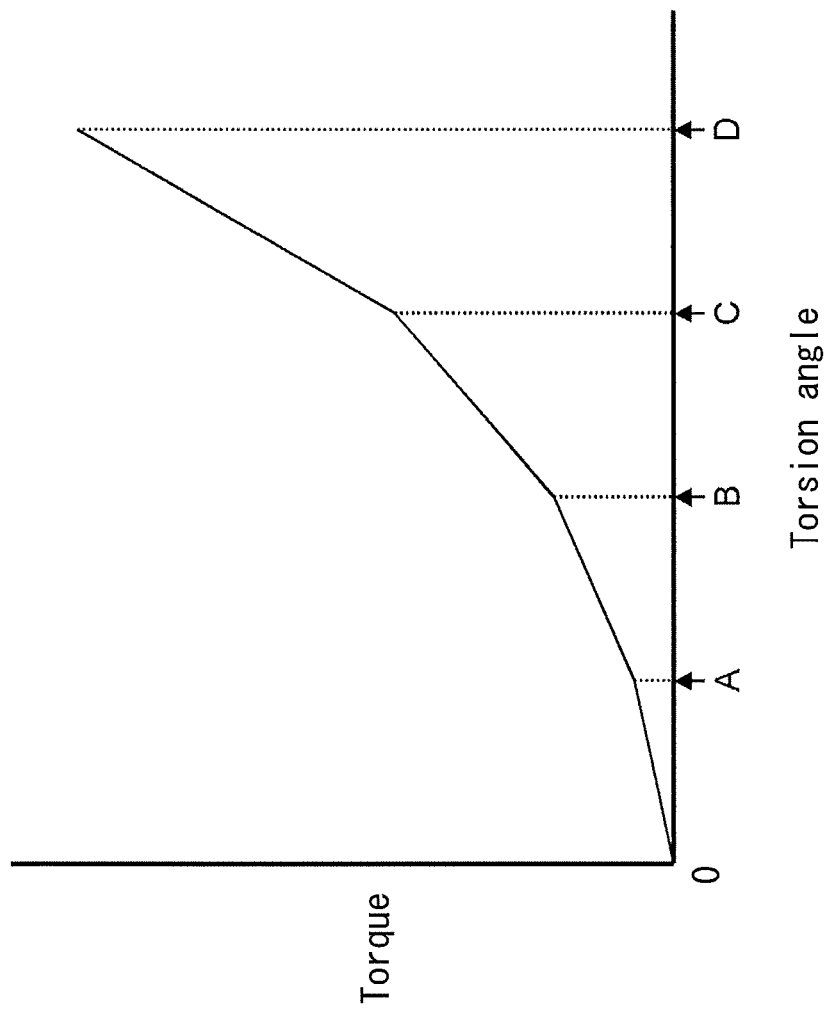
FIG. 5 is a graph showing a torque characteristic for a torsion angle against torque for the torque fluctuation absorber according to the embodiment.

At each of the opening portions 11b, when no relative rotational torsion exists at the damper portion 2, a clearance 33 (as shown in FIG. 4B) is defined between a portion on the second seating member 17 positioned outwardly in a radial direction and a portion of the opening portion 11b positioned outwardly in a radial direction relative to the second supporting portion 11d. At each of the opening portions 11b, when a relative rotational torsion exists at the damper portion 2, the clearance 33 (as shown in FIG. 4B) becomes smaller between the second seating member 17, which is in contact with the corresponding second supporting portion 11d, at the portion outward in the radial direction relative to the corresponding portion of the opening portion 11b positioned outwardly in the radial direction of the second supporting portion 11d. Further, when the clearance 33 (as shown in FIG. 4B) becomes none, the portion of the opening portion 11b positioned outwardly in the radial direction relative to the second supporting portion 11d starts biasing the portion on the second seating member 17 positioned outwardly in the radial direction. Moreover, when a relative rotational torsion exists at the damper portion 2, the portion of the opening portion 11b positioned outwardly in the radial direction relative to the second supporting portion 11d moves further away from the second seating member 17, which is detached from the corresponding second supporting portion 11d.

The side plate 12 is an annular plate member, and is a member composing the damper portion 2 and the hysteresis portion 3. The side plate 12 transmits a rotational power from the plate 10 to the damper portion 2 and the hysteresis portion 3. The side plate 12 is positioned with a space between the side plate 11. The side plate 12 is connected to the side plate 11 at the outer periphery portion by rivets 13 or other connecting means together with the projected portion 10b of the plate 10. The side plate 12 rotates together with the plate 10 and the side plate 11. The side plate 12 includes the opening portions 12a, which contain the first seating members 14 and the set of first coil springs 15, 16, and include opening portions 12b, which contains second seating members 17 and the set of second coil springs 18, 19 at the damper portion 2, in other words at a middle portion in a radial direction of the side plate 12. The side plate 12 engages with the thrust member 22 at the hysteresis portion 3 positioned inwardly in a radial direction relative to the damper portion 2 in a manner that the thrust member 22 moves in an axial direction and the rotation is restricted. The side plate 12 also retains the outer peripheral edge of the coned disc spring 23. The side plate 12 is rotationally supported to the hub member 20 intermediated by the thrust member 22.

Each of the opening portions 12a includes the pair of first supporting portions 12c on one of circumferential end surfaces of the opening portion 12a, the end surface positioned inwardly in a radial direction. Each of the first supporting portions 12c selectively contacts the corresponding first pivoting portion 14a on the corresponding first seating member 14. When no relative rotational torsion exists at the damper portion 2, both first supporting portions 12c are in contact with the first pivoting portion 14a on the corresponding first seating member 14. When a relative rotational torsion exists at the damper portion 2, one of the pair of first supporting portions 12c is in contact with the first pivoting portion 14a on the corresponding first seating member 14 while the other first supporting portion 12c is detached from the first pivoting portion 14a on the other first seating member 14. Each of the first supporting portions 12c rotationally (pivotally) supports the first pivoting portion 14a on the corresponding first seating member 14 while the first pivoting portion 14a is in contact with the corresponding first supporting portion 12c.

At each of the opening portions 12a, when no relative rotational torsion exists at the damper portion 2, the clearance 31 (as shown in FIG. 3B) is defined between a portion on the first seating member 14 positioned outwardly in a radial direction and a portion of the opening portion 12a positioned outwardly in a radial direction relative to the first supporting portion 12c. At each of the opening portions 12a, when a relative rotational torsion exists at the damper portion 2, the clearance 31 (as shown in FIG. 3B) becomes smaller between the first seating member 14, which is in contact with the corresponding first supporting portion 12c, at the portion outward in the radial direction and the corresponding portion of the opening portion 12a positioned outwardly in the radial direction relative to the first supporting portion 12c. Further, when the clearance 31 (as shown in FIG. 3B) becomes none, the portion of the opening portion 12a positioned outwardly in the radial direction relative to the first supporting portion 12c starts biasing the portion on the first seating member 14 positioned outwardly in the radial direction. Moreover, when a relative rotational torsion exists at the damper portion 2, the portion on the opening portion 12a positioned outwardly in the radial direction relative to the first supporting portion 12c moves further away from the first seating member 14, which is detached from the corresponding first supporting portion 11c.

Each of the opening portions 12b includes the pair of the second supporting portions 12d on one of circumferential end surfaces of the opening portion 12b, the end surface which is inward in radial direction. Each of the second supporting portions 12d selectively contacts the second pivoting portion 17a on the corresponding second seating member 17. When no relative rotational torsion exists at the damper portion 2, no contacting portion is defined between any of the second supporting portions 12d and any of the second seating members 17. When a relative rotational torsion exists at the damper portion 2, both of the second supporting portions 12d are detached from the second seating members 17 until one of the pair of the second supporting portions 11d, 12d of the opening portions 11b, 12b on the side plates 11, 12 comes in contact with the second pivoting portion 17a on the corresponding second seating member 17. When a further relative rotational torsion exists at the dumper portion 2, after one of the pair of second supporting portions 11d, 12d of the opening portions 11b, 12b on the side plates 11, 12 comes in contact with the second pivoting portion 17a on the second seating member 17, the detached distance between the other second supporting portion 12d of aforementioned pair and the corresponding second seating member 17 becomes larger. Each of the second supporting portions 12d rotationally (pivotally) supports the second pivoting portion 17a on the corresponding second seating member 17 while the second pivoting portion 17a on the corresponding seating member 17 is in contact with the corresponding second supporting portion 12d.

At each of the opening portions 12b, when no relative rotational torsion exists at the damper portion 2, the clearance 33 (as shown in FIG. 4B) is defined between a portion on the second seating member 17 positioned outwardly in a radial direction and a portion of the opening portion 12b positioned outwardly in a radial direction relative to the second supporting portion 12d. At each of the opening portions 12b, when a relative rotational torsion exists at the damper portion 2, the clearance 33 (as shown in FIG. 4B) becomes smaller between the second seating member 17, which is in contact with the corresponding second supporting portion 12d, at the portion outward in the radial direction and the corresponding portion of the opening portion 12b positioned outwardly in the radial direction relative to the second supporting portion 12d. Further, when the clearance 33 (as shown in FIG. 4B) becomes none, the portion of the opening portion 12b positioned outwardly in the radial direction relative to the second supporting portion 12d starts biasing the portion on the second seating member 17 positioned outwardly in the radial direction. Moreover, when a relative rotational torsion exists at the damper portion 2, the portion on the opening portion 12b positioned outwardly in the radial direction relative to the second supporting portion 12d moves further away from the second seating member 17, which is detached from the corresponding second supporting portion 12d.

The rivet 13 or other connecting means is a member connecting the plate 10 together with the side plates 11, 12.

Each of the first seating members 14 is a member composing the damper portion 2. Each of the first seating members 14 is contained within the corresponding opening portion 11a, 12a, 20c formed on the side plates 11, 12 and on a flange portion 20b on the hub member 20. Each of the first seating members 14 is positioned between an end surface in a circumferential direction of the corresponding opening portion 11a, 12a, 20c, and an edge of the corresponding set of first coil springs 15, 16. Each of the first seating members 14 is formed with a material for example resin to prevent the first coil springs 15, 16 from wearing out. Each of the first seating members 14 includes a first pivoting portion 14a positioned inwardly in a radial direction. Each of the first pivoting portions 14a is being rotationally (pivotally) supported by the corresponding first supporting portion 11c, 12c, 20e of the corresponding opening portion 11a, 12a, 20c while each of the first pivoting portions 14a is in contact with the corresponding first supporting portion 11c, 12c, 20e.

Each of the first coil springs 15 is a member composing the damper portion 2. Each of the first coil springs 15 is contained within the corresponding opening portions 11a, 12a, 20c formed on the side plates 11, 12 and the hub member 20, and is in contact with the first seating members 14 positioned at the opposing ends of each of the first coil springs 15. Each of the first coil springs 15 contracts when a relative rotational torsion exists between the side plates 11, 12 and the hub member 20, and absorbs a shock generated when a rotational difference exists between the side plates 11, 12 and the hub member 20. Each of the first coil springs 15 contracts mainly at the portion of the coil spring 15 inward in the radial direction when a relative rotational torsion exists between the side plates 11, 12 and the hub member 20, and while a clearance 30, 31 (as shown in FIG. 3) is defined between the portion on the first seating member 14, which is in contact with the corresponding first supporting portion 11c, 12c on the side plates 11, 12 or the corresponding first supporting portion 20e on the hub member 20, positioned outwardly in a radial direction and the portion outward in a radial direction relative to the corresponding first supporting portion 11c, 12c on the side plates 11, 12 or the corresponding first supporting portion 20e on the hub member 20. Each of the first coil springs 15 contracts as a whole, when a relative rotational torsion exists between the side plates 11, 12 and the hub member 20, and when the first seating member 14, which is in contact with the corresponding first supporting portion 11c, 12c on the side plates 11, 12 or the corresponding first supporting portion 20e on the hub member 20, positioned outwardly in a radial direction is in contact with the portion of the side plates 11, 12 or the corresponding first supporting portion 20e of the hub member 20, positioned outwardly in a radial direction relative to the corresponding first supporting portion 11c, 12c.

Each of the first coil springs 16 is a member composing the damper portion 2. Each of the first coil springs 16 is, with the associated first coil spring 15, contained within the corresponding opening portion 11a, 12a, 20c formed on the side plates 11, 12 and the hub member 20, and is in contact with the first seating members 14 positioned at the opposing ends of each of the first coil springs 16. Each of the first coil springs 16 is positioned in a space within the associated first coil spring 15. Similar to the first coil spring 15, each of the first coil springs 16 contracts when a relative rotational torsion exists between the side plates 11, 12 and the hub member 20, and absorbs a shock generated when a rotational difference exists between the side plates 11, 12 and the hub member 20. Each of the first coil springs 16 contracts mainly at the portion inward in a radial direction, when a relative rotational torsion exists between the side plates 11, 12 and the hub member 20, and while the clearance 30, 31 (as shown in FIG. 3) is defined between the portion on the first seating member 14, which is in contact with the corresponding first supporting portion 11c, 12c on the side plates 11, 12 or the corresponding first supporting portion 20e on the hub member 20, positioned outwardly in a radial direction and the portion outward in a radial direction relative to the corresponding first supporting portions 11c, 12c on the side plates 11, 12 or the corresponding first supporting portion 20e on the hub member 20. Each of the first coil springs 16 contracts as a whole, when a relative rotational torsion exists between the side plates 11, 12 and the hub member 20 and when the first seating member 14, which is in contact with the corresponding first supporting portions 11c, 12c on the side plates 11, 12 or the corresponding first supporting portion 20e on the hub member 20, positioned outwardly in a radial direction is in contact with the portion positioned outwardly in a radial direction relative to the corresponding first supporting portions 11c, 12c on the side plates 11, 12 or the corresponding first supporting portion 20e on the hub member 20.

Each of the second seating members 17 is a member composing the damper portion 2. Each of the second seating members 17 is contained within the corresponding opening portion 11b, 12b, and the corresponding opening portion 20d, serving as the fourth opening portion, formed on the side plates 11, 12 and on the flange portion 20b on the hub member 20. Each of the second seating members 17 is positioned between an end surface in a circumferential direction of the corresponding opening portion 11b, 12b, 20d, and an edge of the corresponding set of the second coil springs 18, 19. Each of the second seating members 17 is formed with a material for example resin to prevent the second coil springs 18, 19 from wearing out. Each of the second seating members 17 includes the second pivoting portion 17a positioned inwardly in a radial direction. Each of the second pivoting portions 17a is being rotationally (pivotally) supported by the corresponding second supporting portion 11d, 12d, and a corresponding supporting portion 20f, serving as separate supporting portions, of the corresponding opening portion 11b, 12b, 20d while each of the second pivoting portions 17a is in contact with the corresponding second supporting portion 11d, 12d, 20f.

Each of the second coil springs 18 is a member composing the damper portion 2. Each of the second coil springs 18 is contained within the corresponding opening portion 11b, 12b, 20d formed on the side plates 11, 12, and the flange portion 20b of the hub member 20, and is in contact with the second seating members 17 positioned at the opposing ends of each of the second coil springs 18. Each of the second coil springs 18 contracts when a relative rotational torsion exists between the side plates 11, 12 and the hub member 20 and when the second pivoting portion 17a on one of the pair of second seating members 17 contacts the corresponding second supporting portion 11d, 12d of the opening portion 11b, 12b on the side plates 11, 12, and absorbs a shock generated when a rotational difference exists between the side plates 11, 12 and the hub member 20. Each of the second coil springs 18 contracts mainly at the portion inward in radial direction, when a relative rotational torsion exists between the side plates 11, 12 and the hub member 20, and while a clearance 32, 33 (as shown in FIG. 4) is defined between the portion on the second seating member 17, which is in contact with the corresponding second supporting portion 11d, 12d on the side plates 11, 12 or the corresponding second supporting portion 20f on the hub member 20, positioned outwardly in a radial direction and the portion outward in a radial direction relative to the corresponding second supporting portion 11d, 12d on the side plates 11, 12 or the corresponding second supporting portion 20f on the hub member 20. Each of the second coil springs 18 contracts as a whole, when a relative rotational torsion exists between the side plates 11, 12 and the hub member 20 and when the second seating member 17, which is in contact with the corresponding second supporting portion 11d, 12d on the side plates 11, 12 or the corresponding second supporting portion 20f on the hub member 20, positioned outwardly in a radial direction is in contact with the portion outward in a radial direction relative to the corresponding second supporting portion 11d, 12d of the side plates 11, 12 or the corresponding second supporting portion 20f on the hub member 20. The second coil spring 18 is different from the first coil spring 15 in that the second coil spring 18 does not contract when a relative rotational torsion exists between the side plate 11, 12 and the hub member 20, and until when the second pivoting portion 17a on one of the second seating member 17 of the pair comes in contact with the corresponding second supporting portion 11d, 12d in the corresponding opening portion 11b, 12b on the side plates 11, 12.

Each of the second coil springs 19 is a member composing the damper portion 2. Each of the second coil springs 19 is, with the associated second coil spring 18, contained within the corresponding opening portion 11a, 12a, 20c formed on the side plates 11, 12 and the hub member 20, and is in contact with the second seating members 17 positioned at the opposing ends of each of the second coil springs 19. Each of the second coil springs 19 is positioned in a space within the associated second coil spring 18. Similar to the second coil spring 18, each of the second coil springs 19 contracts when a relative rotational torsion exists between the side plates 11, 12 and the hub member 20, and absorbs a shock generated when a rotational difference exists between the side plates 11, 12 and the hub member 20, and when the second pivoting portion 17a on one of the pair of second seating members 17 contacts the corresponding second supporting portion 11d, 12d of the opening portion 11b, 11b on the side plates 11, 12. Each of the second coil springs 19 contracts mainly at the portion inward in a radial direction, when a relative rotational torsion exists between the side plates 11, 12 and the hub member 20 and while a clearance 32, 33 (as shown in FIG. 4) is defined between the portion on the second seating member 17, which is in contact with the corresponding second supporting portion 11d, 12d on the side plates 11, 12 or the corresponding second supporting portion 20f on the hub member 20, positioned outwardly in a radial direction and the portion outward in a radial direction of the corresponding second supporting portion 11d, 12d of the side plates 11, 12 or the corresponding second supporting portion 20f of the hub member 20. Each of the second coil springs 19 contracts as a whole, when a relative rotational torsion exists between the side plates 11, 12 and the hub member 20 and when the second seating member 17, which is in contact with the corresponding second supporting portion 11d, 12d on the side plates 11, 12 or the corresponding second supporting portion 20f on the hub member 20, positioned outwardly in a radial direction is in contact with the portion outward in a radial direction relative to the corresponding first supporting portion 11d, 12d of the side plates 11, 12 or the corresponding first supporting portion 20f of the hub member 20. The second coil spring 19 is different from the first coil spring 16 in that the second coil spring 19 does not contract when a relative rotational torsion exists between the side plate 11, 12 and the hub member 20, and until when the second pivoting portion 17a on one of the second seating member 17 of aforementioned pair comes in contact with the corresponding second supporting portion 11d, 12d in the corresponding opening portion 11b, 12b on the side plates 11, 12.

The hub member 20 is a member composing the damper portion 2 and the hysteresis portion 3 which includes the flange portion 20b extending outward in a radial direction from predetermined portion on a periphery of a cylindrical hub portion 20a. The hub member 20 outputs a rotational power received from the damper portion 2 and the hysteresis portion 3. The hub portion 20a includes an internal spline formed on the internal periphery to connect (engage) a rotation shaft (an external spline) of a motor generator. The hub portion 20a rotationally supports the side plate 11 intermediated by the thrust member 21. The hub portion 20a rotationally supports the side plate 12 intermediated by the thrust member 22. The flange portion 20b includes multiple projected portions 20g projecting outward in an radial direction at an outer peripheral edges. Each of the projected portions 20g is a member composing a stopper portion that restricts excessive relative rotational torsion (excessive relative rotational torsion between the hub member 20 and the side plate 11, 12) occurring at the damper portion 2. Each of the projected portions 20g selectively contacts projected portions 10b on the plate 10. The flange portion 20 b includes the opening portions 20c for containing the first seating members 14 and the set of first coil springs 15, 16, and the opening portions 20d for containing the second seating members 17 and the set of second coil springs 18, 19, both to serve as the damper portion 2. The flange portion 20b is sandwiched between the surfaces in an axial direction of the thrust members 21, 22 at the hysteresis portion 3, positioned inwardly in a radial direction relative to the damper portion 2 in a manner that the flange portion 20b slides between the thrust members 21, 22.

Each of the opening portion 20c includes a pair of first supporting portions 20e on one of circumferential end surfaces of the opening portion 20c, the end surface positioned inwardly in the radial direction. Each of the first supporting portions 20e selectively contacts the corresponding first pivoting portion 14a on the corresponding first seating member 14. When no relative rotational torsion exists at the damper portion 2, both first supporting portions 20e are in contact with the first pivoting portion 14a on the corresponding first seating member 14. When a relative rotational torsion exists at the damper portion 2, one of the pair of first supporting portions 20e is in contact with the first pivoting portion 14a on the corresponding first seating member 14 while the other first supporting portion 20e is detached from the first pivoting portion 14a on the other first seating member 14. Each of the first supporting portions 20e rotationally (pivotally) supports the first pivoting portion 14a on the corresponding first seating member 14 while the first pivoting portion 14a is in contact with the corresponding first supporting portion 20e.

At each of the opening portions 20c, when no relative rotational torsion exists at the damper portion 2, the clearance 30 (as shown in FIG. 3A) is defined between a portion on the first seating member 14 positioned outwardly in a radial direction and a portion of the opening portion 20c positioned outwardly in a radial direction relative to the first supporting portion 20e. At each of the opening portions 20c, when a relative rotational torsion exists at the damper portion 2, the clearance 31 (as shown in FIG. 3B) becomes smaller between the first seating member 14, which is in contact with the corresponding first supporting portion 20e, at the portion outward in the radial direction and the corresponding portion of the opening portion 20c positioned outwardly in the radial direction relative to the first supporting portion 20e. Further, when the clearance 30 (as shown in FIG. 3A) becomes none, the portion of the opening portion 20c positioned outwardly in the radial direction relative to the first supporting portion 20e starts biasing the portion on the first seating member 14 positioned outwardly in the radial direction. Moreover, when a relative rotational torsion exists at the damper portion 2, the opening portion 20c positioned outwardly in the radial direction relative to the supporting portion 20c moves further away from the first seating member 14, which is detached from the first supporting portion 20e.

Each of the opening portions 20d includes a pair of second supporting portions 20f on one of circumferential end surfaces of the opening portion 20d, the end surface which is inward in the radial direction. Each of the second supporting portions 20f selectively contacts the corresponding second pivoting portion 17a on the corresponding second seating member 17. When no relative rotational torsion exists at the damper portion 2, both of the second supporting portions 20f of the pair and second seating members 17 are in contact. When a relative rotational torsion exists at the damper portion 2, both of the second supporting portions 20f of aforementioned pair is in contact with the corresponding second seating member 17 until one of the pair of second supporting portions 11d, 12d at the corresponding opening portions 11b, 12b on the side plates 11, 12 comes in contact with the second pivoting portion 17a on the corresponding second seating member 17. When a further relative rotational torsion exists at the dumper portion 2, and after one of the pair of second supporting portions 11d, 12d of the corresponding opening portions 11b, 12b on the side plates 11, 12 comes in contact with the second pivoting portion 17a on the corresponding second seating member 17, one of the pair of the second supporting portion 20f is in contact with the second pivoting portion 17a on the corresponding second seating member 17 while the other second supporting portion 20f of aforementioned pair detach from the second pivoting portion 17a on the corresponding second seating member 17. Each of the second supporting portions 20f rotationally (pivotally) supports the corresponding second pivoting portion 17a while the second pivoting portion 17a on the corresponding second seating member 17 is in contact with the corresponding second supporting portion 11d.

At each of the opening portions 20d, when no relative rotational torsion exists at the damper portion 2, the clearance 32 (as shown in FIG. 4A) is defined between the portion on the second seating member 17 positioned outwardly in a radial direction and the portion of the opening portion 20d positioned outwardly in a radial direction relative to the second supporting portion 20f. The opening portion 20d is different from the opening portion 11b, 12b on the side plates 11, 12 in that, when a relative rotational torsion exists at the damper portion 2, the size of the clearance 32 (as shown in FIG. 4A) does not change until one of the pair of second supporting portions 11d, 12d of the opening portions 11b, 12b on the side plates 11, 12 comes in contact with the second pivoting portion 17a on the corresponding second seating member 17. When a further relative rotational torsion exists at the dumper portion 2, and after one of the pair of second supporting portions 11d, 12d of the corresponding opening portions 11b, 12b on the side plates 11, 12 comes in contact with the second pivoting portion 17a on the corresponding second seating member 17, the clearance 32 (as shown in FIG. 4A) becomes smaller between the second seating member 17, which is in contact with the corresponding second supporting portion 20f, at the portion outward in the radial direction and the corresponding portion of the opening portion 20d positioned outwardly in the radial direction relative to the second supporting portion 20f. Further, when the clearance 32 (as shown in FIG. 4A) becomes none, the portion of the opening portion 20d positioned outwardly in the radial direction relative to the second supporting portion 20f starts biasing the portion on the second seating member 17 positioned outwardly in the radial direction. Moreover, when a relative rotational torsion exists at the damper portion 2, the portion on the opening portion 20d positioned outwardly in the radial direction relative to the second supporting portion 20f moves further away from the second seating member 17, which is detached from the corresponding second supporting portion 20f.

The thrust member 21 is an annular member composing the hysteresis portion 3. The thrust member 21 is positioned between the side plate 11 and the flange portion 20b of the hub member 20. The thrust member 21 engages with the side plate 11 in a manner that the thrust member 21 moves in an axial direction of the side plate 11 and the rotation is restricted. The thrust member 21 is in pressure contact with the flange portion 20b in a manner that the thrust member 21 slides against the flange portion 20b.

The thrust member 22 is an annular member composing of the hysteresis portion 3. The thrust member 22 is positioned between the side plate 12 and the flange portion 20b of the hub member 20. The thrust member 22 engages with the side plate 12 and the coned disc spring 23 in a manner that the thrust member 22 moves in an axial direction of the side plate 12 and the coned disc spring 23 and the rotation is restricted. The thrust member 22 is biased by the coned disc spring 23 from the direction of the side plate 12, and is in pressure contact with the flange portion 20b in a manner that the thrust member 22 slides against the flange portion 20b.

The coned disc spring 23 is a coned disc member composing of the hysteresis portion 3, positioned between the thrust member 22 and the side plate 12. The coned disc spring 23 biases the thrust member 22 against the flange portion 20b of the hub member 20.

The operation of the torque fluctuation absorber according to the embodiment in this disclosure will be described hereafter by referring to FIGS. 1 to 4. FIG. 5 is a graph showing a typical torque characteristic against the relative rotational torsion angle of the torque fluctuation absorber according to the embodiment.

A power transmission path according to the first embodiment of the torque fluctuation absorber will be described, referring to FIGS. 1 to 4. When no relative rotational torsion exists at the damper portion 2, the rotational power from the rotational shaft of the engine is transmitted to the rotational shaft of the motor generator in the following order of the plate 10, the rivets 13 or other connecting means, the side plates 11, 12, the first coil springs 15, 16, and the hub member 20. At this stage, during the power transmission from the side plates 11, 12 to the hub member 20, the second coil springs 18, 19 are not included in the power transmission path since no rotational power is transmitted to the second coil springs 18, 19 from the side plate 11, 12.

In this stage, when a relative rotational torsion exists between the plate 10 and the hub member 20, and until one of the pair of second supporting portions 11d, 12d at the corresponding opening portions 11b, 12b on the side plates 11, 12 comes in contact with the second pivoting portion 17a on the corresponding second seating member 17, the set of first coil springs 15, 16 absorbs a fluctuation torque at the damper portion 2. At this point, until the portion on the first seating member 14, which is in contact with the corresponding first supporting portions 11c, 12c of the side plates 11, 12 or the corresponding first supporting portion 20e of the hub member 20, at the portion outward in a radial direction comes in contact with the portion on the side plates 11, 12 or the hub member 20 positioned outwardly in radial direction relative to the first supporting protion 11c, 12c, 20e, an inward portion in a radial direction of the first coil springs 15, 16 mainly functions (refer to a torsion angle range between 0 and the torsion angle A in FIG. 5). When the first seating member 14, which is in contact with the corresponding first supporting portions 11c 12c of the side plates 11, 12 or the first supporting portions 20e of the hub member 20, positioned outwardly in a radial direction is in contact with the portion on the side plates 11, 12 or the hub member 20 positioned outwardly in the radial direction relative to the first supporting portions 11c, 12c, 20e, the set of first coil springs 15, 16 as a whole function solely, until the second coil spring 18, 19 starts functioning (refer to a torsion angle range between the torsion angle A and a torsion angle B, equivalent to the second torsion angle, in FIG. 5). Even at this stage, the second coil springs 18, 19 are not included in the power transmission path from the side plates 11, 12 to the hub member 20, since no rotational power is transmitted to the second coil springs 18, 19 from the side plates 11, 12.

When a further relative rotational torsion exists between the plate 10 and the hub member 20 and when one of the pair of second supporting portions 11d, 12d at the corresponding opening portions 11b, 12b on the side plates 11, 12 comes in contact with the second pivoting portion 17a on the corresponding second seating member 17, the damper portion 2 begins absorbing a fluctuation torque at the first coil springs 15, 16 and the separate second coil springs 18, 19. In other words, from this stage on, the rotational power from the side plate 11, 12 are being transmitted to the second coil springs 18, 19, therefore included in the power transmission path from the side plate 11, 12 to the hub member 20. At this point, until the first seating member 17, which is in contact with the corresponding second supporting portion 11d, 12d of the side plate 11, 12 or the second supporting portion 20f of the hub member 20 at the portion outward in a radial direction, comes in contact with the portion on the side plates 11, 12 or the hub member 20 positioned outwardly in a radial direction, the set of first coil springs 15, 16 as a whole function solely and the set of second coil springs 18 function mainly at the portion inward in a radial direction (refer to a torsion angle range between the torsion angle B and a torsion angle C, which is equivalent to the third torsion angle, in FIG. 5). Further, when the portion on the first seating member 14, which is in contact with the corresponding second supporting portion 11d, 13 of the side plates 11, 12 or the second supporting portion 20f of the hub member 20, at the portion outward in radial direction comes in contact with the portion on the side plates 11, 12 or the hub member 20 positioned outwardly in the radial direction relative to the second supporting portions 11d, 12d, 20f, the set of first coil springs 15, 16 function as a whole and the set of separate second coil springs 18, 19 also function as a whole (refer to a range of torsion angles between the torsion angle C and the torsion angle D in FIG. 5).

In the aforementioned operation, whether a rotational direction of the plate 10 against the hub member 20 is clockwise or counterclockwise is irrelevant.

According to the embodiment of the torque fluctuation absorber 1 disclosed here, a torsional characteristic from a low torque range to a high torque range shifts continuously in a stepwise increasing direction (shown as four stages in FIG. 5). Decreasing a torsional rigidity difference at a transition between each stage at the damper portion 2 prevents a driver from losing drivability by sensing a discomfort due to a large torsional rigidity difference at a transition from the low torque range to a high torque range.

A torque fluctuation absorber 1 disclosed here includes side plates 11, 12 including the opening portions 11a, 12a, a hub member 20 aligned on a same axis of side plates 11, 12 and including the opening portion 20c, a set of first coil springs 15, 16 each placed within the opening portions 11a, 12a, 20c for buffering a relative rotational torsion between the side plates 11, 12 and the hub member 20, a pair of first seating members 14 placed at opposing ends of each set of first coil springs 15, 16, each of the first seating members 14 selectively contacts a corresponding end surface in a circumferential direction of the corresponding opening portion 11a, 12a, 20c, the first seating members 14 which on each include a first pivoting portion 14a positioned inwardly in a radial direction, and a first supporting portion 11c, 12c, 20e, which rotationally supports the corresponding first pivoting portion 14a at the end surface in the circumferential direction of the corresponding opening portions 11a, 12a, 20c. When no relative rotational torsion exists between the side plates 11, 12 and the hub member 20, the first pivoting portions 14a on the corresponding first seating members 14 are in contact with the corresponding first supporting portions 11c, 12c, 20e of the opening portions 11a, 12a, 20c, while a clearance 30, 31 is defined between a portion on each of the first seating members 14 positioned outwardly in a radial direction relative to the first pivoting portion 14a and a corresponding portion of the opening portions 11a, 12a, 20c positioned outwardly in a radial direction relative to the corresponding first supporting portion 11c, 12c, 20e. When a relative rotational torsion exists between the side plates 11, 12 and the hub member 20 and when the relative rotational torsion angle between the side plates 11, 12 and the hub member 20 reaches a torsion angle A, the first pivoting portion 14a on the corresponding first seating member 14 is in contact with the corresponding first supporting portions 11c, 12c, 20e of the opening portions 11a, 12a and of the opening portion 20c, and a portion on the first seating member 14 positioned outwardly in the radial direction relative to the respective pivoting portion 14a comes in contact with a corresponding portion of the opening portions 11a, 12a, or the opening portion 20c positioned outwardly in the radial direction relative to the corresponding first supporting portion 11c, 12c, 20e in a state where the first pivoting potion 14a on the corresponding first seating member 14 is in contact with the corresponding first supporting portion 11c, 12c, 20e in the opening portions 11a, 12a, 20c.

According to the torque fluctuation absorber 1 disclosed here, when a relative rotational torsion exists between the side plates 11, 12 and the hub member 20, and when the relative rotational torsion angle between the side plates 11, 12 and the hub member 20 is less than the torsion angle A, the portion on the first seating member 14 positioned outwardly in the radial direction relative to the first pivoting portion 14a approaches the corresponding portion of the opening portions 11a, 12a or the opening portion 20c positioned outwardly in the radial direction relative to the first supporting portion 11c, 12c, 20e by a pivotal movement of the first pivoting portion 14a at the corresponding first supporting portion 11c, 12c, 24e of the opening portions 11a, 12a or the opening portion 20c.

According to the torque fluctuation absorber 1 disclosed here, when a relative rotational torsion exists between the side plates 11, 12 and the hub member 20, and when the relative rotational torsion angle between the side plates 11, 12 and the hub member 20 becomes larger than the torsion angle A, the portion of the opening portions 11a, 12a, or the opening portion 20c positioned outwardly in a radial direction relative to the first supporting portion 11c, 12c, 20e biases the corresponding portion on the first seating member 14 positioned outwardly in the radial direction relative to the first pivoting portion 14a.

The torque fluctuation absorber 1 disclosed here includes, opening portions 11b, 12b on the side plates 11, 12, at a circumferentially shifted position relative to the opening portions 11a, 12a, an opening portion 20d on the hub member, at a circumferentially shifted position relative to the opening portion 20c, a set of second coil springs 18, 19 placed within the opening portions 11b, 12b, 20d for buffering the relative rotational torsion between the side plates 11, 12 and the hub member 20, second seating members 17 placed at opposing ends of each set of second coil springs 18, 19, selectively contact an end surface in a circumferential direction of the opening portion 11b, 12b, 20d, a second seating member 17 including a separate pivoting portion 17a at an inner portion in a radial direction, a second supporting portion 11d, 12d, 20f, at the end surface in a circumferential direction of the opening portion 11b, 12b and the fourth opening portion 20d, which rotationally supports the corresponding second pivoting portion 17a. When no relative rotational torsion existing between the side plates 11, 12 and the hub member 20, a clearance 32, 33 is defined between each of the second seating members 17 and the end surface in circumferential direction of one of the opening portions 11b, 12b or the opening portion 20d, and in the other one of the opening portion 11b, 12b or the opening portion 20d, the second pivoting portions on the corresponding second seating member 17 is in contact with the corresponding second supporting portion 11d, 12d, 20f, and furthermore a clearance 30, 31 is defined between a portion on each of the second seating member 17 positioned outward in a radial direction relative to the corresponding second pivoting portion 17a and a portion in the aforementioned the other one of the opening portions 11b, 12b or the opening portion 20d positioned outwardly in a radial direction relative to the corresponding second supporting portion 11d, 12d, 20f. When a relative rotational torsion exists between the side plates 11, 12 and the hub member 20, and when the relative rotational torsion angle between the side plates 11, 12 and the hub member 20 becomes larger than the torsion angle A and reaches a torsion angle B, the second pivoting portion 17a on the corresponding second seating member 17 comes in contact with the corresponding second supporting portion 11d, 12d, 20f of one of the opening portions 11b, 12b or the opening portion 20d.

According to the torque fluctuation absorber 1 disclosed here, when a relative rotational torsion exists between the side plates 11, 12 and the hub member 20, and when the relative rotational torsion angle between the side plates 11, 12 and the hub member 20 becomes larger than the torsion angle B and reaches a torsion angle C, the portion on each of the second seating member 17 positioned outwardly in the radial direction relative to the corresponding second pivoting portion 17a comes in contact with the portion of the opening portions 11b, 12b or the opening portion 20d positioned outwardly in a radial direction relative to the corresponding second supporting portion 11d, 12d, 20f.

According to the torque fluctuation absorber 1 disclosed here, when a relative rotational torsion exists between the side plates 11, 12 and the hub member 20, and when the relative rotational torsion angle between the first rotational members 11, 12 and the second rotational member 20 is between the torsion angle B and the torsion angle C, the portion on each of the second seating members 17 positioned outwardly in a radial direction relative to the corresponding second pivoting portion 17a approaches the corresponding portion of the opening portions 11b, 12b or the opening portion 20d positioned outwardly in the radial direction relative to the separate second supporting portion 11d, 12d, 20f by a pivotal movement of the pivoting portion 17a at the corresponding separate second supporting portion 11d, 12d, 20f of the opening portion 11b, 12b or the opening portion 20d.

According to the torque fluctuation absorber 1 disclosed here, when a relative rotational torsion exists between the side plates 11, 12 and the hub member 20, and when the relative rotational torsion angle between the side plates 11, 12 and the hub member 20 becomes larger than the torsion angle C, the portion of the opening portions 11b, 12b or the opening portion 20d positioned outwardly in the radial direction relative to the second supporting portion 11d, 12d, 20f biases the corresponding portion on the second seating member 17 positioned outwardly in the radial direction relative to the second pivoting portion 17a.

The torque fluctuation absorber 1 according to the embodiment disclosed here smoothly shifts the torsional characteristic from a low torque range to a higher fourth torque range continuously in a stepwise increasing direction with a decreased difference of a torsional rigidity between the two stages thus preventing a driver from losing drivability.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorber comprising:
  a first rotational member including a first opening portion and a third opening portion circumferentially offset from the first opening portion, the first opening portion including circumferentially opposing end surfaces bounding the first opening portion, the third opening portion including circumferentially opposing end surfaces bounding the third opening portion;
  a second rotational member aligned on a same axis of the first rotational member, the second rotational member including a second opening portion and a fourth opening portion circumferentially offset from the second opening portion, the second opening portion including circumferentially opposing end surfaces bounding the second opening portion, the fourth opening portion including circumferentially opposing end surfaces bounding the fourth opening portion;
  a first coil spring placed within the first opening portion and the second opening portion for buffering a relative rotational torsion between the first rotational member and the second rotational member;
  a second coil spring placed within the third opening portion and the fourth opening portion for buffering the relative rotational torsion between the first rotational member and the second rotational member;
  first seating members placed at opposing ends of the first coil spring, each first seating member being configured to contact one of the circumferentially opposing end surfaces of the first opening portion and one of the circumferentially opposing end surfaces of the second opening portion;
  second seating members placed at opposing ends of the second coil spring, each second seating member being configured to contact one of the circumferentially opposing end surfaces of the third opening portion and one of the circumferentially opposing end surfaces of the fourth opening portion;
  each first seating member including a first pivoting portion at an inner portion in a radial direction; and
  each second seating member including a second pivoting portion at an inner portion in the radial direction;
  first supporting portion portions at the circumferentially opposing end surfaces of the first opening portion and the second opening portion, each first supporting portion being configured to rotationally support one of the first pivoting portions;
  second supporting portions at the circumferentially opposing end surfaces of the third opening portion and the fourth opening portion, each second supporting portion being configured to rotationally support one of the second pivoting portions;
  when no relative rotational torsion exists between the first rotational member and the second rotational member: (i) the first pivoting portion of each first seating member contacts a corresponding one of the first supporting portions of the first opening portion and the second opening portion; (ii) a first clearance is defined between a portion of each of the first seating members positioned outwardly in a radial direction relative to the first pivoting portions and respective portions of the first opening portion and the second opening portion positioned outwardly in a radial direction relative to the first supporting portions; (iii) a second clearance is defined between each of the second seating members and the circumferentially opposing end surfaces bounding the fourth opening portion; (iv) each of the second pivoting portions of the second seating members contacts a corresponding one of the second supporting portions of the third opening portion; and (v) a third clearance is defined between a portion of each of the second seating members positioned outwardly in the radial direction relative to the second pivoting portions and a portion of the third opening portion positioned outwardly in the radial direction relative to the second supporting portions;
  when a relative rotational torsion exists between the first rotational member and the second rotational member and when the relative rotational torsion angle between the first rotational member and the second rotational member reaches a first torsion angle, the portion of each first seating member positioned outwardly in the radial direction relative to the first pivoting portions comes in contact with the portion of the first opening portion or the second opening portion positioned outwardly in the radial direction relative to the first pivoting portions in a state where the first pivoting portion of each first seating member contacts the corresponding one of the first supporting portions of the first opening portion and the second opening portion; and
  when a relative rotational torsion exists between the first rotational member and the second rotational member and when the relative rotational torsion angle between the first rotational member and the second rotational member becomes larger than the first torsion angle and reaches a second torsion angle, each of the second pivoting portions contacts a corresponding one of the second supporting portions of the fourth opening portion.

2. The torque fluctuation absorber according to claim 1, wherein,
  when a relative rotational torsion exists between the first rotational member and the second rotational member and when the relative rotational torsion angle between the first rotational member and the second rotational member is less than the first torsion angle, the portion of the first seating member positioned outwardly in the radial direction relative to the first pivoting portion approaches the corresponding portion of the first opening portion or the second opening portion positioned outwardly in the radial direction relative to the first supporting portion portions by a pivotal movement of the first pivoting portion at the corresponding first supporting portion of the first opening portion or the second opening portion.

3. The torque fluctuation absorber according to claim 1, wherein,
when a relative rotational torsion exists between the first rotational member and the second rotational member and when the relative rotational torsion angle between the first rotational member and the second rotational member becomes larger than the first torsion angle, the portion of the first opening portion or the second opening portion positioned outwardly in the radial direction relative to the first supporting portion biases the corresponding portion of the first seating member positioned outwardly in the radial direction relative to the first pivoting portion.

4. The torque fluctuation absorber according to claim 1, wherein
when a relative rotational torsion exists between the first rotational member and the second rotational member and when the relative rotational torsion angle between the first rotational member and the second rotational member becomes larger than the second torsion angle and reaches a third torsion angle, the portion of each of the second seating members positioned outwardly in the radial direction relative to the second pivoting portion portions comes in contact with the corresponding portion of the third opening portion or the fourth opening portion positioned outwardly in the radial direction relative to the second supporting portions.

5. The torque fluctuation absorber according to claim 4, wherein
when a relative rotational torsion exists between the first rotational member and the second rotational member and when the relative rotational torsion angle between the first rotational member and the second rotational member is between the second torsion angle and the third torsion angle, the portion of each of the second seating members positioned outwardly in the radial direction relative to the first pivoting portions approaches the corresponding portion of the third opening portion or of the fourth opening portion positioned outwardly in the radial direction relative to the second supporting portion by a pivotal movement of the second pivoting portions at the corresponding second supporting portions of the third opening portion or of the fourth opening portion.

6. The torque fluctuation absorber according to claim 1, wherein
when a relative rotational torsion exists between the first rotational member and the second rotational member and when the relative rotational torsion angle between the first rotational member and the second rotational member becomes larger than the third torsion angle, the portion of the third opening portions or of the fourth opening portion positioned outwardly in the radial direction relative to the second supporting portion biases the corresponding portion on the second seating member positioned outwardly in the radial direction relative to the corresponding second pivoting portion.

\* \* \* \* \*